United States Patent
Leitch

(10) Patent No.: US 7,072,671 B2
(45) Date of Patent: Jul. 4, 2006

(54) RADIO SYSTEM, APPARATUS, AND METHOD OF OPERATING THE RADIO SYSTEM

(75) Inventor: Adam S. Leitch, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/513,012

(22) PCT Filed: Apr. 25, 2003

(86) PCT No.: PCT/IB03/01732

§ 371 (c)(1),
(2), (4) Date: Oct. 28, 2004

(87) PCT Pub. No.: WO03/094564

PCT Pub. Date: Nov. 13, 2003

(65) Prior Publication Data

US 2005/0162271 A1    Jul. 28, 2005

(30) Foreign Application Priority Data

May 2, 2002    (GB) ................................. 0210064.2

(51) Int. Cl.
*H04Q 7/20* (2006.01)
*H04Q 7/00* (2006.01)
*H04B 7/00* (2006.01)
*G01S 3/02* (2006.01)

(52) U.S. Cl. .................. 455/456.1; 455/41.2; 455/500; 342/450

(58) Field of Classification Search ............. 455/456.1, 455/41.2, 66.1, 420, 502, 524, 500, 507, 455/525; 342/450; 370/338
See application file for complete search history.

(56) References Cited

U.S. PATENT DOCUMENTS

| 5,423,056 A | * | 6/1995 | Linquist et al. ............. 455/458 |
| 6,055,429 A | * | 4/2000 | Lynch ........................ 455/445 |
| 6,442,392 B1 | * | 8/2002 | Ruutu et al. ............. 455/456.1 |
| 6,754,470 B1 | * | 6/2004 | Hendrickson et al. ... 455/67.11 |
| 6,795,688 B1 | * | 9/2004 | Plasson et al. ............. 455/41.2 |

* cited by examiner

*Primary Examiner*—George Eng
*Assistant Examiner*—Wesley Kim
(74) *Attorney, Agent, or Firm*—Adam L. Stroud

(57) ABSTRACT

A method of determining the relative position of a secondary station (SS) in a radio system including at least one master station (MS) and a plurality of secondary stations (SS), comprises the master station establishing a master log of the time stamp of signals transmitted by active stations and their identities and active secondary stations (SS) establishing a log of the time stamp of signals transmitted by other stations and their respective measured received quality. One of the active secondary stations forwards its log to the master station and the master station correlates the time stamps in the received log with the time stamps in the master log in order to determine the identities of the transmitters and utilizes the measured signal quality indications in the received log to determine the relative position of the secondary station with respect to the locations of the transmitters identified.

5 Claims, 3 Drawing Sheets

RADIO SYSTEM, APPARATUS, AND METHOD OF OPERATING THE RADIO SYSTEM

The present invention relates to a radio system, apparatus for use in the system, and to a method of operating the radio system, particularly but not exclusively, for determining the position of a radio unit or station in the radio system.

Radio positioning systems are well known and include triangulation where bearings are made on at least two signal sources and position is determined to be at the point of intersection of the two bearings.

European Patent Specification EP 1 111 951 A2 discloses a wireless system such as DECT (Digitally Enhanced Cordless Telephone) or a wireless LAN, comprising a plurality of base stations, each of which transmits a unique base station identifier. A portable station whose position is to be determined makes signal quality measurements, such as received signal strength or bit error rate, on downlink signals from at least three base stations. The portable station reports these signal quality measurements together with the respective base station identities to a server which correlates the signal quality measurements against a layout architecture plan of the base stations within the coverage area of the communication system. A relative location of the portable device is then ascertained by the server, with the relative location information being made available to a requesting client, such as a PC.

Such a system is intended for use in relatively large environments, such as offices, which require a wireless network to have strategically sited base stations in order to provide a substantially continuous radio coverage area. Also it essential for the cited system that the portable station remain energised for a sufficiently long time period that the base station identities can be recorded. Such a system is unsuited to determining position in a relatively small network such as may be found in a domestic situation where there may be only one base station and the portable units are inexpensive low power radio devices, such as may be provided with a key ring.

An object of the present invention is to provide a simple, reliable, low cost radio positioning system.

According to one aspect of the present invention there is provided a radio system comprising at least one master station and a plurality of secondary stations, the master station having means for establishing a master log of the time stamp of signals transmitted by active stations and their identities, each of the secondary stations having means for establishing a log of the time stamp of received signals together with their measured quality and means for forwarding at least a portion of their log to the master station, the master station further comprising means for correlating the time stamps in the log forwarded to it with the time stamps in its master log in order to identify the transmitters originating, the signals received and for utilising the signal quality measurements in the received log to determine the relative position of a secondary station.

According to a second aspect of the present invention there is provided a method of determining the relative position of a secondary station in a radio system including at least one master station and a plurality of secondary stations, the method comprising the master station establishing a master log of the time stamp of signals transmitted by active stations and their identities, active secondary stations establishing a log of the time stamp of signals transmitted by other stations and their respective measured received quality, one of the active secondary stations forwarding its log to the master station and the master station correlating the time stamps in the received log with the time stamps in the master log in order to determine the identities of the transmitters and utilising the measured signal quality indications in the received log to determine the relative position of the secondary station with respect to the locations of the transmitters identified.

If desired the secondary stations measure the RSSI of a received signal. This has the advantage that the secondary station only has to remain powered-up to measure the strength of the signal, which can be brief, and avoids the necessity of having to determine the identity of the station transmitting the signal. This avoids the need for the secondary station to synchronise with the received signal and to demodulate and decode it which saves battery power consumption. Other known methods of measuring the quality of radio signals include bit error rate (BER), Phase of Arrival (POA), Time of Arrival (TOA) and Frequency of Arrival (FOA).

Optionally the master log may store the relative locations of some of the non-portable features, for example fixtures such as hi-fi systems, smoke alarms, security sensors, light switches, central heating controls, in the space being monitored and the position of a secondary station is indicated relative to at least one of the non-portable features.

The position of a secondary station may be indicated visually for example as a message displayed on the screen of a television receiver.

According to a third aspect of the present invention there is provided a master station for use in a radio system having a plurality of secondary stations, the master station comprising receiving means, means for establishing a master log of the time stamp of signals transmitted by active stations and their identities, means for correlating time stamps in a log forwarded to it by one of the plurality of secondary stations with the time stamps in its master log in order to identify the transmitters originating the signals received and for utilising the signal quality measurements in the received log to determine the relative position of the secondary station.

According to a fourth aspect of the present invention there is provided a secondary station for use in a radio system comprising a master station and a plurality of secondary stations, the secondary station comprising receiving means, means for establishing a log of the time stamp of received signals together with their measured quality and means for forwarding at least a portion of their log to the master station.

The present invention will now be described, by way of example, with reference to the accompanying drawings, wherein.

In the drawings the same reference numerals have been used to indicate corresponding features.

Figure 1:
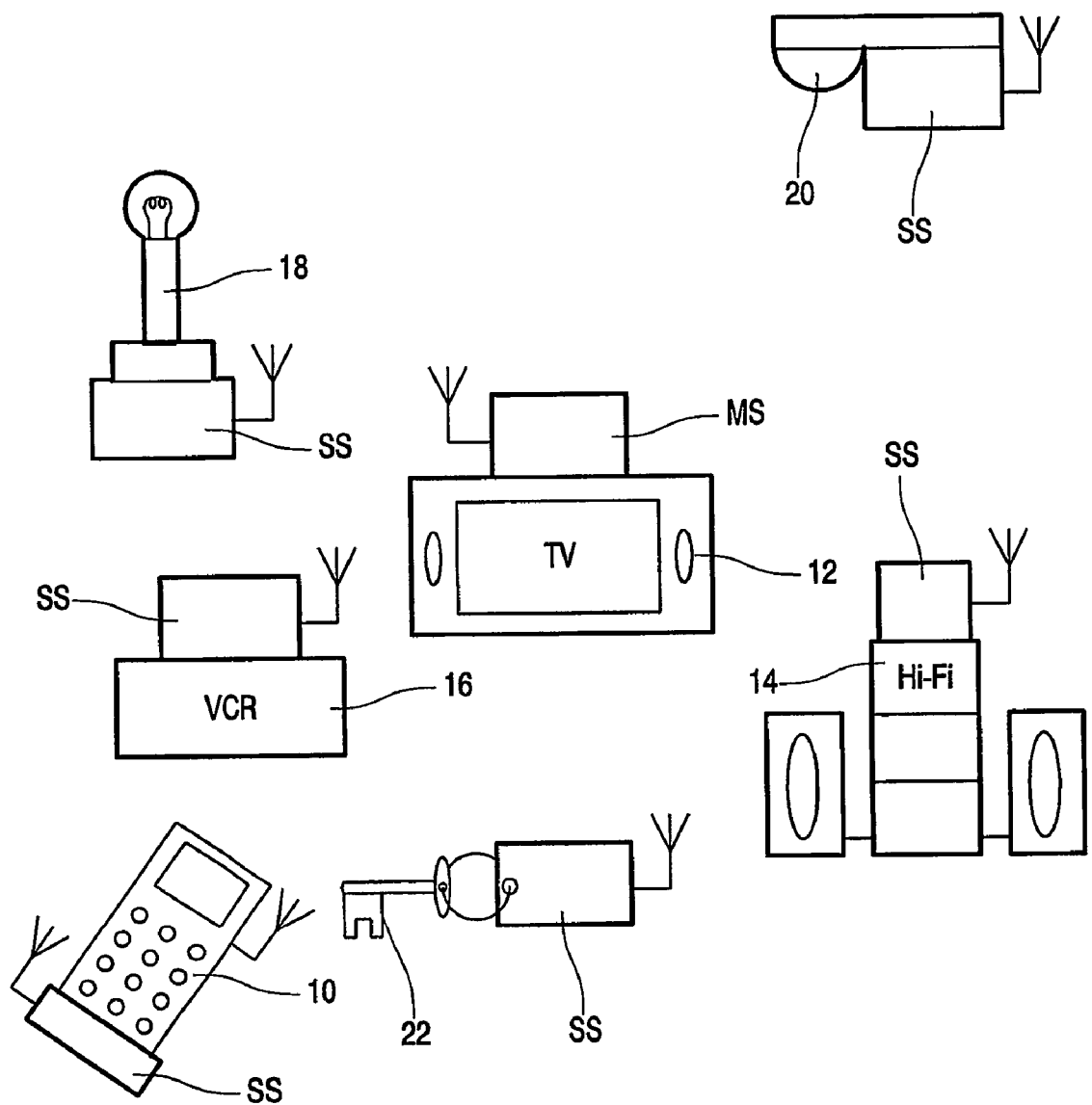
FIG. 1 is a block schematic diagram of a radio LAN.

Referring to FIG. 1, the illustrated radio LAN is provided to enable a user with a remote controller 10, which may be incorporated into a cellular/cordless phone, to control and/or monitor the behaviour of appliances such as a television (TV) receiver 12, a hi-fi system 14, a video cassette recorder (VCR) 16, a table lamp 18 and a security sensor 20. Such a radio LAN may operate in accordance with a known protocol such as Bluetooth, Registered Trade Mark, ZigBee or IEEE 802.11. As details of these protocols are published they will not be discussed further as they are not relevant to the understanding of the present invention.

In order to determine position, radio units are associated with articles whose position or location needs to be known to a user. In the illustrated embodiment the radio units are shown attached to not only the nominally fixed appliances 12 to 20 but also to portable devices such as the remote controller 10 and a key 22.

The architecture of the radio system is configured around a master station MS, which in FIG. 1 is mounted on and connected to the TV receiver 12, and a plurality of secondary stations SS. Before describing embodiments of the secondary and master stations, the operation of the system will be briefly described. The basic principle for determining position/location relies on the master station MS determining the position/location of an appliance or article based on the quality, for example the strength, of radio signals from some known transmitters as received by the secondary stations SS and stored in a log which is forwarded by radio to the master station MS. As the secondary stations are low power consuming radio units, it is desired that their on-times are as brief as possible. With this object in mind, the method in accordance with the present invention assumes that the times of receipt of signals by the secondary stations can be correlated with the times of transmission of the signals, which may occur at regular intervals or at random, and therefore it is unnecessary for the secondary stations to remain powered-up to demodulate a received signal and decode the signal to determine the transmitter's identity. However if battery economy is not of prime significance then the quality of the received signals can be determined using techniques such as bit error rate (BER), Phase of Arrival (POA), Time of Arrival (TOA) and Frequency of Arrival (FOA) which require some processing of the received signal.

Each time one of the transmitters transmits, the master station MS notes from the transmission the identification of the transmitter and the time at which the transmission occurs (time stamp) and stores this information in a master log. The secondary stations SS when active detect any in-range transmissions and note the time and signal quality, normally the received radio signal strength (RSS) which has a value dependent on the distance from a transmitter and the transmit power, and stores in its own log the time of transmission (time stamp) and the radio signal strength indicator (RSSI). Because only the RSS is measured, it is unnecessary to demodulate the signal or obtain the transmitter identifier. Therefore the radio units attached to the appliances 12 to 20 need not all operate using the same radio LAN protocol such as Bluetooth, Zigbee & IEEE 802.11 but may use different protocols, so there is no requirement for a plurality of the secondary stations SS to operate a common protocol. Furthermore, because it is unnecessary for a secondary station whose location is to be determined to demodulate signals transmitted by the other secondary stations, such a secondary station need not conform with the same protocol as these other secondary stations. Whenever appropriate or necessary, a secondary station SS forwards its log to the master station MS. A processor in the master station MS correlates the time stamp entries in the secondary station's log with those in its master log and determines the identities of the transmitters and their respective transmit powers. Using this information together with the corresponding RSSIs in the secondary station's log, the position/location of the secondary station is determined.

Optionally the nominal output powers of the transmitters are also stored with their identities by the master station MS and when a radio signal is received from one of the transmitters its signal strength is noted and compared to the nominal output power thereby checking that the transmitter is operating satisfactorily and/or if it has been shifted from its previous position. If there is any doubt about the performance of the transmitter it can be ignored when computing the position of a secondary station.

Figure 2:
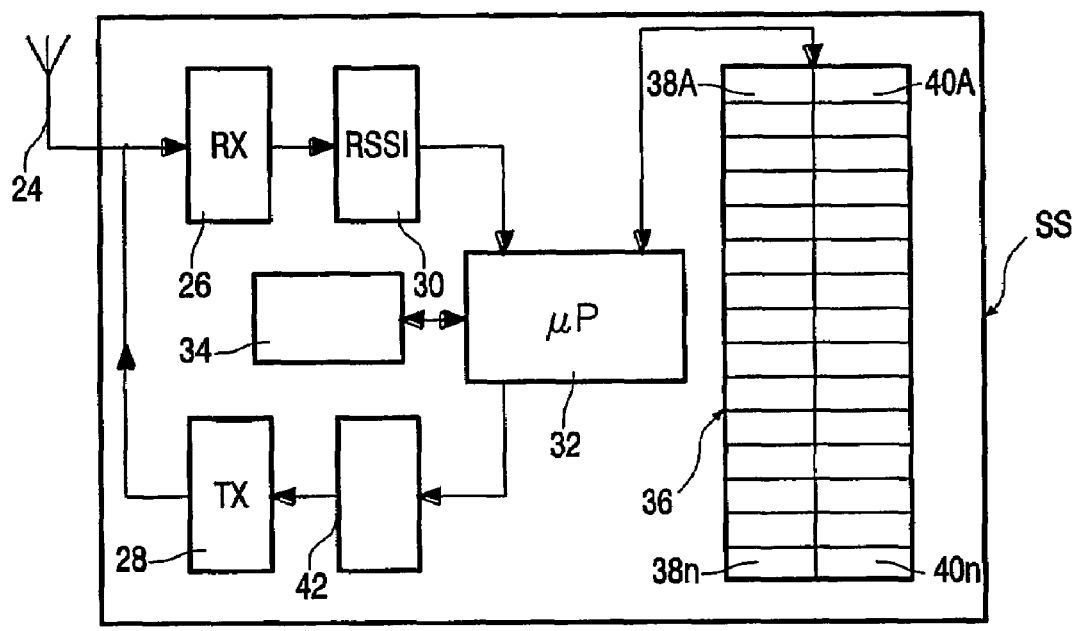
FIG. 2 is a block schematic diagram of a secondary station.

Referring to FIG. 2, a secondary station SS comprises a transceiver consisting of an antenna 24 coupled to the input of a receiver (Rx) stage 26 and to the output of a transmitter (Tx) stage 28. A RSS measuring stage 30 is coupled to the Rx stage 26. The RSS stage 30 produces a RSSI which is supplied to a microprocessor 32. A clock 34 is coupled to the microprocessor 32. The microprocessor 32 forwards the RSSI and time of receipt to a log 36, constituted by a RAM, which has pairs of memory locations 38A, 40A to 38$n$, 40$n$, for storing, respectively, the time and the RSSI. In an alternative, non-illustrated arrangement the receiver stage 26 and the RSS stage 30 have inputs coupled to the antenna 14 and outputs coupled to respective inputs of the microprocessor 32.

The microprocessor 32 is also coupled to a modulator 42 which modulates entries read-out from the log 36 onto a carrier wave for onward transmission by the Tx 28 to the master station MS.

Figure 3:
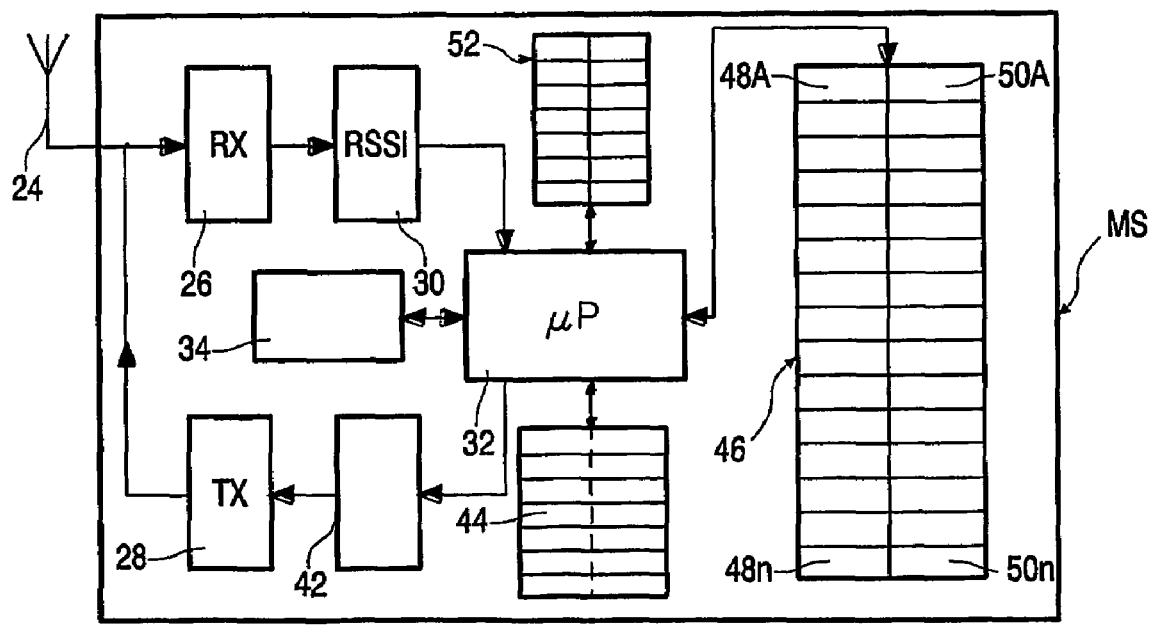
FIG. 3 is a block schematic diagram of a master station.

Referring to FIG. 3, the architecture of the master station MS is slightly different from that of the secondary station SS. In the interests of brevity only the differences will be described in the following. The microprocessor 32 is coupled to a first memory (RAM) 44 which has pairs of storage locations for storing transmitter identifications and their respective locations, optionally their output powers may also be stored, to a second memory (RAM) which functions as the master log 46 which has pairs of storage locations 48A, 50A to 48$n$, 50$n$ for storing, respectively, the time of transmission by one of the transmitters and its identity, and to a third memory (RAM) 52 which has pairs of storage locations for storing times and RSSIs of a secondary station's log which has been forwarded to the master station MS. The first, second and third memories may be respective areas of a large RAM which may be an integrated circuit or some other suitable memory device such as a computer hard drive. Correlation of the entries in the master log 46 and in the third memory 52 is carried out by the microprocessor 32 which subsequently generates position/location information which may displayed on the TV receiver 12, transmitted to the remote controller 10 or sent as a text message to a cellular telephone or as an e-mail to a WAP phone or personal computer.

Figure 4:
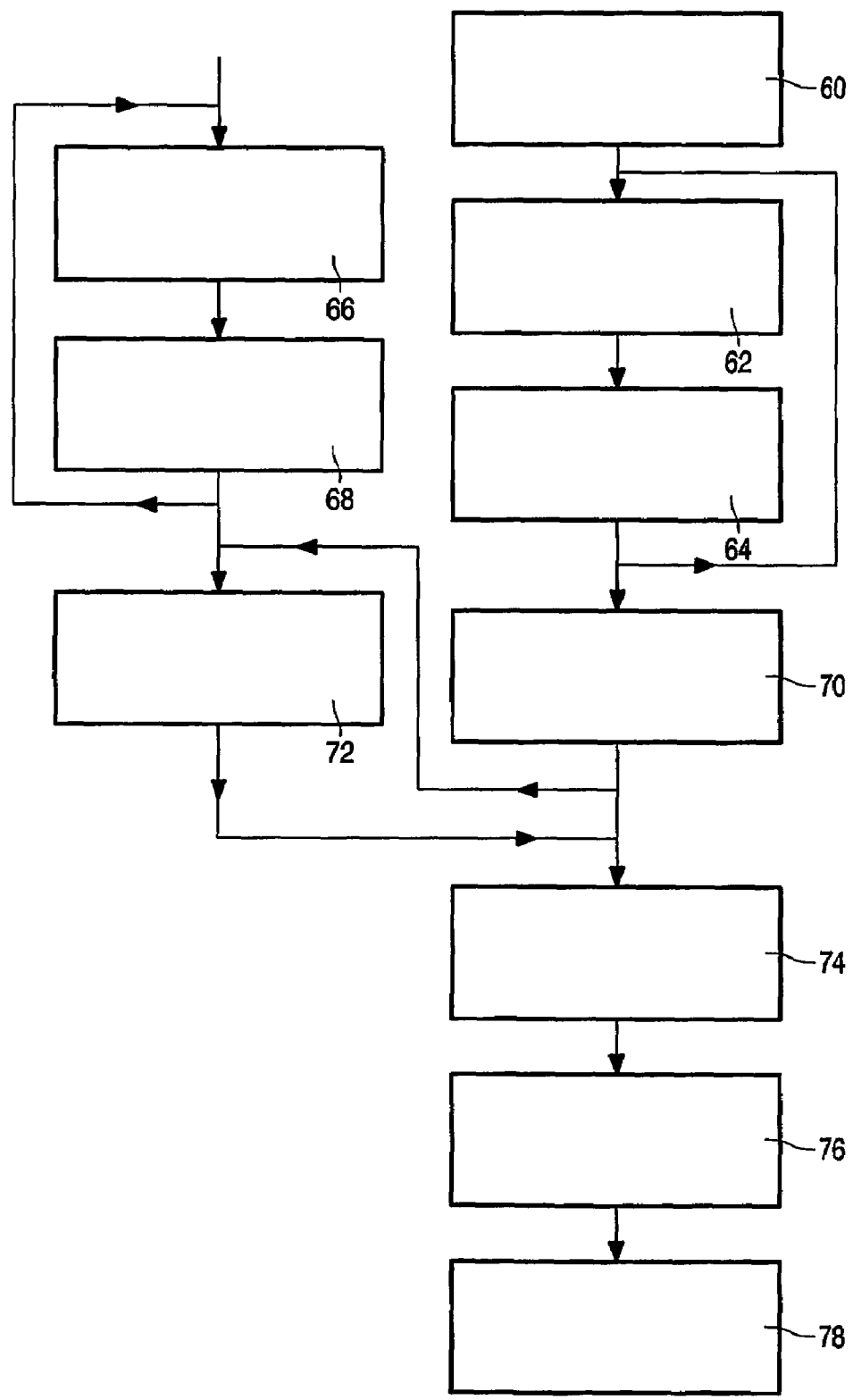
FIG. 4 is a flow chart of an embodiment of the method in accordance with the present invention.

The flow chart shown in FIG. 4 illustrates the processing steps in carrying-out an embodiment of the method in accordance with the present invention. Block 60 relates to the master station MS storing the transmitter identities, locations and, optionally, their nominal or measured output powers in the first memory 44 (FIG. 3). Block 62 relates to the master station receiving transmissions and identifying the transmitters and noting their transmission times as time stamps. Block 64 denotes adding entries to the master log 46 (FIG. 3). The operations shown by the blocks 62, 64 continue as indicated by the output of the block 64 being coupled back to the input of the block 62.

In the meantime block 66 denotes the secondary stations SS receiving transmissions and measuring the RSSs and times. The block 68 denotes each secondary station SS storing the RSSIs and associated time stamp in its log 36 (FIG. 2). The process denoted by the blocks 66, 68 is also a repetitive one.

Block 70 denotes the master station MS instructing one of the secondary stations to forward its log. Block 72 denotes the respective secondary station forwarding the entries from its log and their storage in the third memory 52 (FIG. 3). Block 74 relates to the master station MS correlating the forwarded time stamps with the time stamps in its master log 46 and determining the identities of the transmitters. Block 76 denotes the microprocessor 32 in the master station MS computing the position/location of the secondary station SS. Finally, block 78 denotes the master station informing a user of the position/location determined.

Optionally, if correlating the time stamps or computing the position of the secondary station SS results in an ambiguity, the ambiguity may be resolved by the master station MS measuring the time of flight of a signal transmitted by the secondary station SS and, from the time of flight, calculating the distance of the secondary station SS.

The following example illustrates the method in accordance with the present invention in a practical way. A home automation wireless system is operational in a domestic environment. A single master station integrated into a TV receiver is used to route signals between low power secondary stations. Several secondary stations have a requirement for positional information and thus have the appropriate functionality to monitor and maintain a log of received signal strengths and the corresponding time stamps. Over the previous 30 minutes these secondary stations have been logging all signals present in the room. These might include signals from security sensors, hi-fi, light switches, remote controls, central heating controllers and the like. A user requests a positional indicator for a key or a set of keys, for example the key 22 in FIG. 1. The master station MS requests secondary station SS associated with the key 22 to upload the log of RSSIs and time stamps and cross references these against the entries in the master log of all recently active transmitters. A high correlation is calculated between the hi-fi 14 (FIG. 1) and the security sensor 20 (FIG. 1). A message is flashed on the screen of the TV receiver 12 to indicate that the keys are probably midway between the hi-fi 14 and the security sensor 20 on the ceiling.

If a user has provided the master station MS with location information for more significant items of furniture, the master station may be able to produce a suggestion to the user that the keys may be on say, a shelf, above the hi-fi unit.

The present invention may be embodied into wireless systems, whether in a master-slave or peer-to-peer architecture, as it provides a low power solution in which essential processing and cross-referencing of data is done in a single location. This minimises data across the network and allows devices to enter a "sleep" mode as RSSI measurements could be monitored and logged in separate circuitry.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of wireless LANs and component parts therefor and which may be used instead of or in addition to features already described herein.

The invention claimed is:

1. A radio system comprising at least one master station and a plurality of secondary stations, the master station having means for establishing a master log of time stamps of signals transmitted by active ones of the secondary stations and the active stations' identities, at least one of the secondary stations having means for establishing a log of time stamps of signals received from the active stations together with the received signals' measured quality and means for forwarding at least a portion of the log to the master station, the master station further comprising means for correlating the time stamps in a log forwarded to it with the time stamps in its master log in order to identify the active stations originating the signals received by the forwarded log's associated secondary station and for utilising the signal quality measurements in the forwarded log to determine the relative position of the associated secondary station, wherein the master log stores the relative locations of at least some of the active stations that are non-portable in the space being monitored and in that the position of a secondary station is indicated relative to at least one of the non-portable active stations.

2. A method of determining the relative position of a secondary station in a radio system including at least one master station and a plurality of secondary stations, the method comprising the master station establishing a master log of time stamps of signals transmitted by active ones of the secondary stations and the active stations' identities, active secondary stations establishing a log of time stamps of signals transmitted by other active stations and respective measured received quality of the transmitted signals, one of the active secondary stations forwarding its log to the master station and the master station correlating the time stamps in the received log with the time stamps in the master log in order to determine the identities of the active stations and utilising the measured signal quality indications in the received log to determine the relative position of the secondary station with respect to the locations of the active stations identified, wherein the master log stores the relative locations of at least some of the active stations that are non-portable in the space being monitored and in that the position of a secondary station is indicated relative to at least one of the non-portable active stations.

3. A method as claimed in claim 2, characterised in that the secondary stations measure the RSSI of a received signal.

4. A method as claimed in claim 2, characterised in that the position of a secondary station is indicated visually.

5. A master station for use in a radio system having a plurality of secondary stations, the master station comprising receiving means, means for establishing a master log of time stamps of signals transmitted by active ones of the secondary stations and the identities of the active stations, means for correlating time stamps of signals received by a secondary station from an active station in a log forwarded to the master station by the secondary station with the time stamps in the master log in order to identify the active stations originating the signals received by the secondary station and for utilising signal quality measurements in the received log to determine the relative position of the secondary station, wherein the master log stores the relative locations of at least some of the active stations that are non-portable in the space being monitored and in that the position of a secondary station is indicated relative to at least one of the non-portable active stations.

* * * * *